United States Patent [19]

Chao

[11] Patent Number: 4,626,471

[45] Date of Patent: * Dec. 2, 1986

[54] MICROENCAPSULATION BY IN-SITU POLYMERIZATION OF MULTIFUNCTIONAL EPOXY RESINS

[75] Inventor: Hung-Ya Chao, Williamsville, N.Y.

[73] Assignee: Moore Business Forms, Inc., Grand Island, N.Y.

[*] Notice: The portion of the term of this patent subsequent to Jan. 22, 2002 has been disclaimed.

[21] Appl. No.: 705,078

[22] Filed: Feb. 25, 1985

[51] Int. Cl.$^4$ .................. B01J 13/02; B32B 27/38
[52] U.S. Cl. .................. 428/402.21; 264/4.7; 346/215; 428/914
[58] Field of Search .................. 264/4.7; 428/402.21

[56] References Cited

U.S. PATENT DOCUMENTS

| | | | |
|---|---|---|---|
| 2,299,694 | 10/1942 | Green | 106/22 X |
| 2,712,507 | 7/1955 | Green | 346/214 X |
| 3,016,308 | 1/1962 | Macaulay | 264/4.4 X |
| 3,219,476 | 11/1965 | Robbins | 264/4.7 X |
| 3,429,827 | 2/1969 | Ruus | 264/4.7 X |
| 3,720,534 | 3/1973 | Macaulay et al. | 428/321.3 |
| 3,726,804 | 4/1973 | Matsukawa et al. | 264/4.7 |
| 3,822,181 | 7/1974 | Vassiliades et al. | 264/4.1 X |
| 3,864,275 | 2/1975 | Kan et al. | 264/4.7 |
| 3,928,230 | 12/1975 | Unsworth et al. | 264/4.7 X |
| 4,016,099 | 4/1977 | Wellman et al. | 264/4.1 X |
| 4,140,336 | 2/1979 | Maalouf | 346/215 |
| 4,187,194 | 2/1980 | Wellman et al. | 264/4.6 X |
| 4,209,188 | 6/1980 | Chao et al. | 264/4.7 X |
| 4,495,509 | 1/1985 | Chao | 264/4.7 X |

FOREIGN PATENT DOCUMENTS 1091076 11/1967 United Kingdom .................. 264/4.7

Primary Examiner—Richard D. Lovering
Attorney, Agent, or Firm—Allegretti, Newitt, Witcoff & McAndrews, Ltd.

[57] ABSTRACT

A method of forming microcapsules by in-situ polymerization is disclosed. The microcapsules are prepared by forming an organic solution containing a polyfunctional amine curing agent and an epoxy resin select from the group consisting of 4-glycidyloxy-N, N-di-glycidyl aniline and methylolated bisphenol A based epoxy resins. This organic solution is then dispersed or emulsified within an aqueous continuous phase. The amine agent then polymerizes the epoxy resin, which migrates to the interface between the continuous and discontinuous phases to form the microcapsular wall. The resulting microcapsules are characterized by relatively high impermeability and are especially useful in carbonless copying systems.

13 Claims, No Drawings

MICROENCAPSULATION BY IN-SITU POLYMERIZATION OF MULTIFUNCTIONAL EPOXY RESINS

BACKGROUND OF THE INVENTION

1. Field of the Invention

The present invention relates to microcapsules and methods of microencapsulating a core of fill material. The resulting microcapsules are adaptable to a variety of applications, but particularly for use in carbonless copying systems.

2. Background of the Invention

Microcapsules generally comprise a core of fill material surrounded by a wall or shell of polymeric material. The fill material may be either gaseous, liquid, or solid, and may be composed of a single substance, a solution, a suspension or a mixture of substances. The wall surrounding the core of fill material acts to isolate the fill material from the external environment. When it is desirable to release the fill material, the capsule wall may be ruptured by mechanical pressure, for example, thereby introducing the fill material into its surroundings. Generally, microcapsules comprise separate and discrete capsules having non-interconnecting hollow spaces for a fill material. The fill material is thus enveloped within the generally continuous polymeric walls of the microcapsules, which may range from 0.1 to approximately 500 microns in diameter.

Uses for microcapsules are as varied as the materials that can be microencapsulated. Of particular importance are the uses of microcapsules in medicinal and biological preparations, fertilizers, flavorings, deodorizers, adhesives, xerographic toners, and carbonless copying systems.

Though microcapsules and microencapsulation techniques are applicable to a wide variety of products, one of the most significant applications is their use in carbonless copying systems. The present invention is particularly adaptable to carbonless copying systems and will be discussed primarily in connection with such systems. However, it should be understood that the invention is not limited to carbonless copy applications and may be used wherever the use of microcapsules is beneficial.

Carbonless copying systems usually include a plurality of paper sheets arranged in a manifold set, each sheet of the set having one or more coatings on its surfaces. The manifold set is designed so that when a marking pressure caused by a typewriter, pen, or other instrument is applied to the outermost sheet, a colored mark will be formed on at least one surface of each sheet of the manifold set.

To this end, the top sheet of the manifold set to which the marking pressure is applied is provided with a coating on its back surface. This coated back surface includes microcapsules containing an initially colorless chemically reactive color-forming dye precursor as the fill material. The upper surface of the next sheet, which is adjacent to the back surface of the top sheet, is coated with a material containing a component, such as phenolic resin or reactive clay, that is capable of reacting with the colorless dye precursor contained in the microcapsules to produce a color. Thus, a marking pressure on the upper surface of the top sheet will rupture the microcapsules on the bottom surface and release the colorless dye precursor. The colorless dye precursor then chemically reacts with the reactive component of the coated front of the lower sheet to produce a colored mark corresponding to the area of marking pressure. In similar fashion, colored marks are produced on each succeeding sheet of the manifold set by the marking pressure rupturing the microcapsules carried on the lower surface of each sheet.

The sheets of the manifold set in carbonless copying systems are designated in the art by the terms CB, CFB, and CF, which stand respectively for "coated back", "coated front and back", and "coated front". The CB sheet is usually the top sheet of the manifold set and the sheet upon which the marking pressure is applied. The CFB sheets are the intermediate sheets of the manifold set, each of which is able to have a mark formed on its front surface by a marking pressure and each of which also transmits the contents of ruptured microcapsules from its back surface to the front surface of the next sheet. The CF sheet is the bottom sheet and is only coated on its front surface so that an image may be formed on it.

While it is customary to have the coating containing the microcapsules on the back surface of the sheets and to have the coating containing the reactive component for the capsules on the front surface of each of the sheets, a reverse arrangement is also possible. In addition, one or more of the reactive ingredients may be carried in the sheets themselves, rather than applied as surface coatings. Furthermore, the reactive component for the colorless dye precursor may be microencapsulated instead of or in addition to the precursor. Patents illustrative of the various kinds of systems that may be used in the production of manifold carbonless copying systems include by way of example: U.S. Pat. Nos. 2,299,694 (Green); 2,712,507 (Green); 3,016,308 (Macaulay); 3,429,827 (Ruus); and 3,720,534 (Macaulay et al).

The literature also contains many methods and techniques for preparing microcapsules, whereby two or more reactive components are brought together to form a microcapsular wall. A majority of these methods form the encapsulating walls by providing minute discrete droplets containing the intended fill material dispersed within a continuous phase that contains at least one of the reactive components. In one class of microencapsulation technique, the walls of the microcapsules are formed from reactive components that are present only in the continuous phase and not within the dispersed droplets. Examples of such microencapsulation methods are the urea-formaldehyde polymerization technique disclosed in U.S. Pat. No. 3,016,309 (Macaulay), the coacervation methods described in U.S. Pat. No. Re. 24,899 (Green) and the in situ polymerization method taught in U.S. Pat. No. 3,219,476 (Robbins).

The Macaulay patent teaches the formation of a high molecular weight urea-formaldehyde condensate wall from a urea-formaldehyde precondensate that is present in the continuous phase. The reaction is carried out by adjusting the pH of the continuous phase. The Green patent discloses forming a gelatinous coating around oil droplets containing the fill material. This coating is then hardened into microcapsule walls by cross-linking agents present in the continuous phase. The Robbins patent describes a method of encapsulating aerosol particles. Aerosol particles are first formed followed by intimately contacting said particles with an unsaturated organic monomer selected from the group consisting of diolefins, vinyl esters, or esters of, B-unsaturated acids having from 4 to 25 carbon atoms and causing said monomers to polymerize on said aerosol particles thereby encapsulating the particles.

A second class of microencapsulation is interfacial polycondensation exemplified by U.S. Pat. No. 3,429,827 (Ruus). The method taught by Ruus includes producing an aqueous dispersion of a water immiscible organic liquid containing one of the reactive components. A second reactant is then added to the aqueous phase whereupon the reactants form a polymer wall at the interface between the aqueous and organic phases.

A third class of microencapsulation is in-situ polymerization. In this class of microencapsulation techniques, the microcapsule walls are formed from materials present only in the discontinuous phase. Thus, the wall forming materials dispersed into the discontinuous phase polymerize and migrate outward to the interface between the discontinuous and continuous phases, resulting in the formation of the microcapsule wall. Known techniques of in-situ polymerization include free radical polymerization and the incorporation of reactive polyisocyanates and polyol compounds within the discontinuous phase.

A wide variety of microencapsulation methods are known in the art as exemplified by the following patents. U.S. Pat. No. 4,187,194 (Wellman et al) discloses a microencapsulation process directed primarily to the encapsulation of xerographic toner particles. The process calls for altering the solubility characteristics of the solvent that contains the wall material and the core material in order to effect phase separation. The phase separation is accomplished by vaporizing the solvent or by adding a non-solvent. U.S. Pat. No. 4,016,099 (Wellman et al) discloses a similar process, except that phase separation is effected by the addition of a second solvent that is miscible with the first solvent, but in which the wall material is substantially insoluble. Neither of the Wellman, et al. patents discloses the use of amines or epoxy resins as wall materials.

U.S. Pat. No. 3,928,230 (Unsworth et al) discloses a microencapsulation process whereby the microcapsule walls are formed from epoxy resin monomers and polyamino compounds. The disclosed process involves dissolving the epoxy monomers in an organic solvent and dispersing the solution in water. The substance to be encapsulated is then likewise dispersed in water and an organic solution of the polyamino compound is then mixed into the emulsion. This is not an in-situ polymerization process.

U.S. Pat. No. 3,726,804 (Matsukawa et al) describes a process of microencapsulation by in-situ polymerization. The two wall forming materials are dissolved in an oily liquid core material in the presence of a low-boiling solvent or a polar solvent. After emulsification, the temperature of the system is raised, such that the low-boiling or polar solvent is released from the oily liquid and the wall forming materials are transferred to the surface of the dispersed oil drops, where polymerization and microencapsulation occur. U.S. Pat. No. 3,822,181 (Vassiliades et al) discloses a method of making air-containing microcapsules for holding pigment. U.S. Pat. No. 4,140,336 (Maalouf et al) discloses the treatment of existing, pre-formed polyamide capsules with epoxy resin, preferably a bisphenol A based epoxy resin. The pre-formed polyamide capsules are preferably made by interfacial polycondensation.

In the context of carbonless copying systems, one common problem is the tendency for color to inadvertently develop on the CF and/or CB sheets. This unwanted color development is usually due to the presence of free colorless dye precursor on the CB sheet. The presence of free precursor on the CB sheet may be due to incomplete microencapsulation or accidental microcapsule rupture. Additionally, the walls of produced microcapsules containing the precursor may include faults or pores that allow the colorless dye precursor to leak from the microcapsules. This free dye precursor often causes discoloration by contacting the reactive CF component and thereby changing the dye precursor to its colored form. Discoloration, which has been variously referred to as blush, offset, bluing, ghosting, backprint, etc., is highly objectionable and undesirable in carbonless copying systems. Thus, there is a need for microcapsules that are relatively impermeable to dye precursor solutions such that unacceptable levels of discoloration are avoided.

SUMMARY OF THE INVENTION

It is an object of the present invention to provide a method of forming microcapsules that are capable of containing carbonless dye precursors for use in carbonless systems.

It is a further object of the present invention to provide a method of forming microcapsules containing colorless dye precursors that do not cause unacceptable discoloration in carbonless systems.

It is an additional object of the present invention to provide microcapsules that are sufficiently impermeable to solutions of colorless dye precursors such that blush, offset, bluing, ghosting, backprint, etc., are avoided in carbonless copying systems using such microcapsules.

It is a specific object of the present invention to provide a method of forming microcapsules by in-situ polymerization. The present inventive microcapsules are produced by forming a solution that contains (1) a polyfunctional amine, (2) an epoxy resin selected from the group consisting of methylolated bisphenol A based epoxy resins and 4-glycidyloxy-N,N-di-glycidyl aniline, and (3) an organic solvent capable of dissolving both the amine and the epoxy resin. The resulting organic solution is then emulsified or dispersed in the form of droplets within a substantially aqueous continuous phase. The amine compound then polymerizes the epoxy resin and the polymeric reaction product migrates outward to the interface of the organic droplet and the substantially aqueous continuous phase. This polymerization and migration eventually results in the formation of a microcapsule wall at the interface. If a fill material, such as a colorless dye precursor, is incorporated into the dispersed organic solution, the formed microcapsules will encapsulate the fill material. If the fill material is a colorless dye precursor, the resulting microcapsules are useful in carbonless copying systems, especially since the inventive microcapsules show good impermeability to dye precursor solutions. This impermeability in turn tends to reduce the undesirable phenomenon of discoloration in carbonless systems.

Further objects and embodiments of the present invention will be made known in the following description of the preferred embodiments and claims.

DESCRIPTION OF THE PREFERRED EMBODIMENTS

Two types of multifunctional epoxy resins may be used to form the inventive microcapsules. The first multifunctional resin is 4-glycidyloxy-N,N-di-glycidyl aniline, which is available commercially from the Ciba-Geigy Corporation under the tradename of Ciba-Geigy Epoxy Resin 0510. The second type of multifunctional epoxy resin are methylolated bisphenol A based epoxy resins, such as Apogen 101 which was formerly produced by Schaefer Chemicals Corp. Only these two types of multifunctional epoxy resins fall within the present invention, since other multifunctional epoxy resins do not obtain the unexpected result of relatively impermeable microcapsules.

Any conventional polyamine curing agent may be used in conjunction with the above epoxy resins as the wall forming materials. Suitable polyamine compounds include diethylenetriamine (DETA), triethylenetetramine, tetraethylenepentamine, dimethylaminopropylamine, polyethyleneimines, bishexamethylenetriamine (BHMT), polyglycol amines, polyoxypropylene amines, phenyldiamines, methylenedianilines, and 2,4-bis(p-aminobenzyl) aniline (BABA). The selected polyamino compound should be reactive with the selected epoxy resin such that the amino compound polymerizes the epoxy resin to form material suitable for forming substantially continuous polymeric walls.

Any of a number of conventional organic solvents known in the art of microencapsulation may be used. These include dibutyl phthalate (DBP), dimethyl phthalate, butylbenzyl phthalate (BBP), toluene, xylenes and napthalenes. The selected organic solvent should be capable of dissolving sufficient amounts of both the epoxy resin and the polyamino compound, and yet should not be capable of dissolving or degrading the polymerized wall material, as this would adversely affect the impermeability of the resulting microcapsules. In addition, the selected organic solvent should be capable of dissolving the fill material to be encapsulated.

In order to form the microcapsules of the present invention, the epoxy resin and polyamino curing agent are both dissolved in the selected organic solvent. If a fill material is to be encapsulated, it is dissolved in the organic solvent along with epoxy resin and the amine compound.

Generally, the epoxy resin and amine curing agent should be present in equivalent weights. However, the optimum ratio of the two reactant compounds may be easily determined through routine experimentation using the equivalent weight as a starting point. With respect to the fill material, it should be incorporated in the organic solution in an amount sufficient to accomplish its intended purpose. In the case of colorless dye precursors for use in carbonless systems, from approximately 0.5 wt.% up to approximately 5 wt.% may be incorporated into the organic solution depending upon the solubility and color forming properties of the particular precursor. Any conventional colorless dye precursor, such as crystal violet lactone (CVL), benzoyl leuco methylene blue (BLMB), or the paratoluene sulfinate of Michler's Hydrol (PTSMH) may be used.

The resulting organic solution is then emulsified with a substantially aqueous emulsification solution. One preferred emulsification solution is a 2% partial hydrolyzed polyvinyl alcohol solution available from Air Products & Chemicals under the tradename Vinol 540. Alternatively, a 3% solution containing three parts Reten 300 to one part Gelvatol 20-90 may be used. Reten 300 is the trade name of Hercules Corp. for poly(-beta-methacryloxyethyl-trimethyl ammonium methyl sulfate) and Gelvatol 20-90 is the trade name of Monsanto Corp. for a partially hydrolyzed polyvinyl alcohol. The organic solution should be emulsified into the substantially aqueous emulsification solution until organic droplets having a particle size of approximately 1-30 microns are obtained. This emulsification process results in the formation of discrete organic droplets that are dispersed within an aqueous continuous phase.

The emulsion containing the organic droplets to be encapsulated should be either stirred at ambient temperature and pressure for no more than 60 hours, preferably 20 hours, or should be stirred at ambient pressure at approximately 65°–75° C. for approximately two to three hours. During this stirring process, the amine curing agent is polymerizing the epoxy resin to form the microcapsule wall material. The wall material then migrates to the interface of the discontinuous and continuous phases where it forms the substantially continuous microcapsule wall.

EXAMPLE 1

9.14 parts of 4-glycidyloxy-N,N-diglycidylaniline of Ciba-Geigy 0510 was dissolved in 60 parts of BBP together with 2.4 parts of PTSMH. The solution was brought to room temperature and then mixed with 1.86 parts of DETA. The mixed solution was immediately emulsified in a 2% Vinol 540 solution until 1–15 micron particles were obtained. The slurry was stirred at room temperature for approximately 16–18 hours. Capsule wall formation was completed at this time as observed under scanning electron microscope (SEM) observation. Coating of the resulting capsules on a paper substrate produced excellent blue images upon impact on a clay coated receiving sheet and exhibited good CF drawdown characteristics indicating a good degree of impermeability. The resulting capsules were virtually impervious to acetone.

EXAMPLE 2

9.1 parts of Apogen 101 was heat dissolved in 30 parts of BBP together with 2.4 parts of PTSMH. After bringing the solution to room temperature, it was mixed with 2.1 parts of BHMT. The resultant solution was then emulsified into a 2% Vinol 540 solution until 1–20 micron particles were obtained. Coating of the capsules on paper produced a distinctive blue color upon impact on a reactive clay coated sheet and exhibited fair to good CF drawdown.

EXAMPLE 3

9.13 parts of Ciba-Geigy 0510 and 2.4 parts of PTSMH were dissolved in 60 parts of BBP. The solution was brought to room temperature and 1.86 parts of DETA were mixed into the solution. This solution was then immediately emulsified into 130 parts of a 3% 3:1 Reten 300 to Gelvatol 20-90 emulsification solution until approximately 1–20 micron droplets were obtained. The emulsion was then mechanically stirred at low speed at room temperature for about 60 hours to complete the encapsulation reaction.

The capsule slurry was then coated onto a clay-coated CF sheet at about 3.3 grams per meter square dry coat weight. Discoloration on the sheet in percent reflection was read by a densitometer. A discoloration reading of 100% means no discoloration, which in turn indicates an extremely impermeable microcapsule wall. A discoloration reading above 90% is considered acceptable, while below 80% is considered useless for practical applications in pressure sensitive carbonless copying systems. The intensity of the image obtained from typing the coated CB sheet against a clay-coated CF sheet was read by a densitometer. A reading below 50 is considered good, since a low reading indicates a more intense image. The coated microcapsule slurry of Example 3 resulted in a CF drawdown discoloration reading of 93% and an image intensity reading of 45. Under SEM observation, good spherical capsules were observed.

EXAMPLE 4

The method of Example 3 was repeated substituting 10.04 parts of Apogen 101 for the Ciba-Geigy 0510 and 0.96 parts of DETA for the 1.86 parts used in Example 3. The CB sheet coated with the resulting microcapsules showed a CF drawdown discoloration reading of 84% and an image intensity of 33. Under SEM observation, deflated spherical capsules were observed.

EXAMPLES 5-10

Generally following the methods of Examples 1-4, microcapsules containing the following compounds in the dispersed phase were measured for CF drawdown discoloration with the following results.

| Example | Epoxy Resin | Amine | Precursor | CF Drawdown |
| --- | --- | --- | --- | --- |
| 5 | Ciba-Geigy 0510 | DETA | BLMB | good |
| 6 | Ciba-Geigy 0510 | BHMT | PTSMH | fair |
| 7 | Ciba-Geigy 0510 | BABA | PTSMH | good |
| 8 | Ciba-Geigy 0510 | BHMT | PTSMH | 92.0% |
| 9 | Apogen 101 | DETA | PTSMH | fair |
| 10 | Apogen 101 | BABA | PTSMH | good |

COMPARATIVE EXAMPLES 11-27

| Example | Epoxy Resin | Amine | Precursor | CF Drawdown |
| --- | --- | --- | --- | --- |
| 11 | Ciba 0163 | BABA | PTSMH | fair |
| 12 | Ciba 0163 | DETA | PTSMH | 39.5% |
| 13 | Ciba 0163 | DETA | CVL | 71% |
| 14 | Ciba 0163 | DETA | PTSMH | poor |
| 15 | Ciba 0163 | BHMT | PTSMH | 67.8% |
| 16 | Ciba 0163 | BHMT | PTSMH | poor |
| 17 | Epon 1002 | DETA | PTSMH | 25% |
| 18 | Epon 1002 | BHMT | PTSMH | poor |
| 19 | Epon 1002 | BHMT | CVL | 48.8% |
| 20 | Epon 1002 | BABA | PTSMH | poor-fair |
| 21 | Epon 828 | DETA | PTSMH | 25% |
| 22 | Epon 828 | BABA | PTSMH | poor-fair |
| 23 | Ciba 1139 | DETA | PTSMH | poor-fair |
| 24 | Ciba 1273 | DETA | PTSMH | poor |
| 25 | Ciba 1280 | DETA | PTSMH | poor |
| 26 | Epon 836 | BABA | PTSMH | poor-fair |

Ciba 1139 is a phenol based novolac resin available from Ciba-Geigy under the tradename Ciba EPN 1139. Ciba 1273 and 1280 are cresol based novolac resins available from Ciba-Geigy Corp. under the tradenames Ciba ECN 1273 and Ciba ECN 1280, respectively. Ciba 0163 is 1.1.2.2-(p-hydroxyphenol)ethane based epoxy resin, which is commercially available from Ciba-Geigy Corp. Epon 1002, Epon 828 and Epon 836 are all bisphenol A based epoxy resins available from Shell Chemicals.

As can be seen by comparing the results of Examples 1-10 to the results of comparative Examples 11-26, the inventive microcapsules unexpectedly produce acceptable to superior CF drawdown characteristics. This is indicative of the relatively high impermeability of the inventive microcapsules, property that is highly desirable in the carbonless copying field. Of course, it is to be understood that the present invention has been described in terms of certain preferred embodiments and that other embodiments not specifically described herein may fall within the spirit and scope of the present invention.

I hereby claim as my invention:

1. A method of forming microcapsules by in-situ polymerization comprising the following steps in combination:
   a. forming a solution comprising a polyfunctional amine, an epoxy resin selected from the group consisting of 4-glycidyloxy-N,N-di-glycidyl aniline and methylolated bisphenol A based epoxy resins, and an organic solvent capable of dissolving said amine and said resin; and
   b. dispersing said solution in the form of minute droplets within a substantially aqueous continuous phase such that microcapsular walls form at the periphery of said droplets through the reaction of said amine with said resin.

2. The method of claim 1 wherein said solution additionally comprises a fill material such that said fill material is encapsulated within said microcapsules.

3. The method of claim 2 wherein said fill material is a colorless dye precursor.

4. The method of claim 3 wherein said precursor is present in said solution in an amount of approximately 0.5% to 5% based on the total weight of said solution.

5. The method of claim 1 wherein said amine is selected from the group consisting of diethylenetriamine, triethylenetetramine, tetraethylenepentamine, dimethylaminopropylamine, polyethyleneimines, bishexamethylenetriamine, polyglycol amines, polyoxypropylene amines, phenyldiamines, methylenedianilines and 2,4-bis(p-aminobenzyl)aniline.

6. The method of claim 1 wherein said organic solvent is selected from the group consisting of dibutyl phthalate, dimethyl phthalate, butylbenzyl phthalate, toluene, xylenes and napthalenes.

7. The method of claim 1 wherein said droplets have an average size of approximately 1-30 microns.

8. The method of claim 1 wherein said solution is dispersed within an aqueous emulsification solution such that an emulsion is formed.

9. The method of claim 8 wherein said emulsion is stirred at room temperature for less than 60 hours in order to complete said formation of said microcapsules.

10. The method of claim 9 wherein said emulsion is stirred at room temperature for about 20 hours in order to complete said formation of said microcapsules.

11. The method of claim 8 wherein said emulsion is stirred at approximately 65°-70° C. for approximately 2-3 hours in order to complete said formation of said microcapsules.

12. The method of claim 1 wherein equivalent weights of said amine and said resin are dissolved in said solvent.

13. A microcapsule formed according to the method of claim 1.

* * * * *